United States Patent
Sunku et al.

(10) Patent No.: US 11,202,109 B2
(45) Date of Patent: Dec. 14, 2021

(54) METHOD AND SYSTEM FOR USE OF NETWORK AFFILIATION AS BASIS TO DETERMINE CHANNEL RENDERED BY CONTENT PRESENTATION DEVICE

(71) Applicant: Roku, Inc., San Jose, CA (US)

(72) Inventors: Raghavendra Sunku, Novato, CA (US); Jaehyung Lee, Seoul (KR); Virginie Debelair, San Francisco, CA (US); Peter Dunker, Thuringia (DE)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 16/586,542

(22) Filed: Sep. 27, 2019

(65) Prior Publication Data

US 2021/0021884 A1 Jan. 21, 2021

Related U.S. Application Data

(60) Provisional application No. 62/876,359, filed on Jul. 19, 2019.

(51) Int. Cl.
| | | |
|---|---|---|
| *H04N 21/234* | (2011.01) | |
| *H04N 21/475* | (2011.01) | |
| *H04N 21/64* | (2011.01) | |
| *H04N 21/2343* | (2011.01) | |

(52) U.S. Cl.
CPC ... *H04N 21/23424* (2013.01); *H04N 21/2343* (2013.01); *H04N 21/23418* (2013.01); *H04N 21/4756* (2013.01); *H04N 21/64* (2013.01)

(58) Field of Classification Search
None
See application file for complete search history.

(56) References Cited

U.S. PATENT DOCUMENTS

| | | |
|---|---|---|
| 8,081,938 B2 | 12/2011 | Ishida |
| 8,689,252 B1 | 4/2014 | Rowe |
| 10,063,918 B2 | 8/2018 | Lee et al. |
| 2017/0013324 A1 | 1/2017 | Chen |
| 2017/0155964 A1 | 6/2017 | Oztaskent et al. |
| 2017/0251280 A1* | 8/2017 | Seo ............... H04N 21/435 |
| 2018/0310054 A1 | 10/2018 | Seo et al. |

OTHER PUBLICATIONS

International Search Report and Written Opinion from International Application No. PCT/US2020/042742, dated Oct. 30, 2020.

* cited by examiner

*Primary Examiner* — Omar S Parra
(74) *Attorney, Agent, or Firm* — McDonnell Boehnen Hulbert & Berghoff LLP

(57) ABSTRACT

A computing system detects a channel multi-match with non-matching programs, based on fingerprint-based ACR analysis of digital fingerprint data representing a channel rendered by a content presentation device. The system then responsively determines a channel rendered by the device through a process including (a) determining that channels of the multi-match group are all affiliate channels of the same network as each other and (b) determining, as the channel, which affiliate channel of that network serves a location of the content presentation device. The system then uses the determined channel as a basis for carrying out of at least one channel-specific operation, such as recording audience-measurement data and/or invoking dynamic content modification.

20 Claims, 5 Drawing Sheets

METHOD AND SYSTEM FOR USE OF NETWORK AFFILIATION AS BASIS TO DETERMINE CHANNEL RENDERED BY CONTENT PRESENTATION DEVICE

REFERENCE TO RELATED APPLICATION

This application claims priority to U.S. Provisional Application No. 62/876,359, filed Jul. 19, 2019, the entirety of which is hereby incorporated by reference.

BACKGROUND

A typical content presentation device operates to receive an analog or digital media stream representing media content such as video and/or audio content and to render and present the media content on a user interface such as a display screen and/or an audio speaker. Examples of such devices include, without limitation, televisions, computer monitors, projection systems, loudspeakers, headphones, and the like.

In many cases, such a content presentation device may be in communication with a receiver, such as a local set top box or other similar device or a remote server, that has access to numerous discrete channels of media content and that can selectively deliver a given such channel's media content to the content presentation device for playout.

By way of example, a television may be communicatively linked by a High-Definition Multimedia Interface (HDMI) cable or other interface with a cable-TV set top box that has access to a set of cable-TV channels, and the set top box may be configured to receive user input selecting a particular channel and to responsively tune to the selected channel and output to the television the media content of the selected channel, for presentation of the media content to a user. As another example, a loudspeaker may be communicatively linked with a radio that has access to a set of radio stations, and the radio may be configured to receive user input selecting a particular channel (station) and to responsively tune to the selected channel and output to the loudspeaker the media content of the selected channel, for presentation of the media content to a user. And as still another example, a content presentation device such as a display or speaker may be communicatively linked with a computer that has access to a myriad of online streaming media channels, and the computer may be configured to receive user input selecting a particular channel and to responsively initiate receipt and output of the selected media content and provide the media content to the display and/or speaker for presentation to a user.

SUMMARY

When a content presentation device receives and renders media content, the content presentation device may not have an indication of which channel of media content the content presentation device is rendering. A receiver or other device that selectively tunes to the channel and receives the media content and that provides the media content to the content presentation device may have such information, but the content presentation device that receives the media content from that other device may not have such information. For example, if a television is coupled with a cable-TV set top box and a user selects a particular cable channel on the set top box, the set top box may thereby have an indication of the selected channel as the channel on which the set top box is then receiving a media content that is being output to the television. But the television itself may merely receive and render the media content and may have no indication of the selected channel.

For various reasons, however, it may be useful to determine which of various channels is the channel of content rendered (e.g., being rendered, having been rendered, or in queue to be rendered) by a content presentation device. Further, it may be useful to do so without receiving from a channel-selection device (e.g., receiver or remote control) a report of the channel, and perhaps without any involvement of the channel-selection device. For instance, it may be useful for the content presentation device itself, and/or a network server working in cooperation with the content presentation device, to determine the channel based on an evaluation of the media content rendered by the media presentation.

Given knowledge of the channel of content rendered by the content presentation device, the content presentation device, the network server, and/or another entity could then carry out one or more operations keyed to that channel, such as recording audience-measurement data (e.g., viewership or listenership data, for use in channel ratings) or engaging in dynamic content revision (e.g., selectively replacing a predetermined portion of the media content with alternative content such as a replacement advertisement, or superimposing supplemental content over the media content being rendered), among other possibilities.

One method to determine the channel of content rendered by the content presentation device is to apply fingerprint-based automatic content recognition (ACR) based on digital fingerprint data representing the media content.

With fingerprint-based ACR, a computing system could be provisioned with reference data that includes digital reference fingerprints respectively representing each of various known channels of media content and that maps the reference fingerprints to the respective channels that they represent. Further, as the content presentation device is rendering a channel of media content, the content presentation device could generate and provide the computing system with digital query fingerprints that represent the media content currently being rendered by the content presentation device. The computing system could then compare that query fingerprint data with the reference fingerprint data known to represent media content on various channels. And upon finding that the query fingerprint data matches the reference fingerprint data mapped to a particular channel, the computing system could thus determine that the channel being rendered by the content presentation device is that particular channel.

In practice, the computing system could record and report this determined channel for use as audience-measurement data or for other purposes. For instance, the computing system could generate and provide an ACR data record in which the computing system specifies an identity of the content presentation device, an identity of the determined channel, and a timestamp indicating when the content presentation device was rendering the determined channel, among other possibilities. And this ACR data record could then be used as a basis to inform advertising decisions or for other purposes.

Further, the computing system could use the determined channel as a basis to facilitate dynamic content revision such as dynamic ad insertion (DAI). For instance, once the computing system has determined the channel being rendered by the content presentation device, the computing system could analyze that determined channel of content as the channel is en route to the content presentation device and could detect the presence of a replaceable advertisement on the channel. In response, the computing system could then dynamically cause the content presentation device to replace that upcoming advertisement with a replacement advertisement, such as one targeted based on user demographics or the like.

Unfortunately, however, a problem that can arise in this process is that the same media content may be provided on multiple different channels at a given time, and so digital fingerprint data representing media content being rendered by the content presentation device may not correlate with just the channel being rendered by the content presentation device.

For example, a sports game or political event might be broadcast concurrently on multiple different channels, or a syndicated television or radio show might be broadcast concurrently on multiple different channels. In these or other scenarios, if the content presentation device is presenting such media content and generates and provides query fingerprint data representing the media content, the computing system could map that query fingerprint data to multiple instances of reference fingerprint data corresponding with multiple channels, and consequently the channel identification would be inconclusive.

As a specific example of this, consider a scenario where two different video content providers both broadcast the same sports game, each on a separate respective channel, and where an advertiser has a contract with just one of the content providers to present a targeted replacement advertisement on that provider's broadcast of the game. In this scenario, when a content presentation device is receiving and presenting one of these broadcasts, if the content presentation device generates and provides to the computing system query fingerprint data representing that broadcast, the computing system may find that the query fingerprint data matches reference fingerprint data respectively of both content providers' broadcasts of the game and thus both channels. As a result, it may be unclear whether the content presentation device should present the replacement advertisement or not.

As another example, if the computing system is going to provide an ACR data record for use as audience-measurement data or other purposes, the channel-identification in the ACR data record itself may be inconclusive. Rather than specifying in the ACR data record just a single matching channel, the computing system may construct the ACR data record as a multi-match log that lists the multiple matching channels, i.e., the multiple channels whose reference fingerprint data the computing system determined all matched the query fingerprint data provided by the content presentation device. Yet such a multi-match log may be of relatively little value for audience-measurement purposes or the like, as it would not conclusively specify which of the multiple channels the content presentation device was rendering at the time.

Disclosed herein are methods and systems to help disambiguate channel identification in a scenario where query fingerprint data of a channel rendered by a content presentation device matches multiple instances of reference fingerprint data corresponding respectively with multiple different known channels.

The disclosure provides an integrated, multi-step process that could be carried out by a computing system in real-time or through post-processing. For instance, the computing system could carry out the process in real-time while a content presentation device is rendering a channel of content, to identify the channel so as to facilitate dynamic content revision or other channel-specific operations. Alternatively, the process could be carried out after the fact, through post-processing of one or more multi-match logs as discussed above, among other possibilities.

In accordance with the disclosure, the computing system will detect a channel multi-match scenario based on a determination that query fingerprint data of a channel rendered by the content presentation device matches reference fingerprint data respectively of multiple channels. Given such a channel multi-match, the computing system will further determine based on electronic-program-guide (EPG) information or the like that, at the time of the channel multi-match, at least two of the determined matching channels were scheduled to be presenting different program content than each other. Thus, the computing system will have detected a channel multi-match with non-matching programs.

Practically speaking, this channel multi-match with non-matching programs could occur in various scenarios.

By way of example, at a given time, multiple different channels that are scheduled to be presenting different programs than each other could each be in the midst of a commercial break and could be presenting the same advertisement as each other. In that scenario, the query fingerprint data representing the advertisement being rendered by the content presentation device could match the reference fingerprint data also representing the advertisement respectively on each of those channels, but the programs scheduled on the channels at the time of that channel multi-match would be different than each other.

As another example, at a given time, multiple different channels could be presenting the same live program as each other, and that live program could overrun its scheduled time slot, into a next time slot in which the channels are scheduled to be presenting different programs than each other. As a result, during the overrun, the query fingerprint data representing the overrunning live program being rendered by the content presentation device could match the reference fingerprint data also representing the overrunning live program respectively on each of those channels, but the programs scheduled on the channels at that time would be different than each other.

According to the disclosure, in response to the computing system detecting at least the channel multi-match with non-matching programs, the computing system will then automatically resolve the channel multi-match by taking into account information regarding a network affiliation of a content distributor that distributes the channel to the content presentation device.

In particular, the computing system could evaluate a multi-match log or associated information regarding the channel multi-match with non-matching channels, and the computing system could thereby determine that the matching channels are affiliate channels of the same network as each other. In response to and based on detecting the combined factors of (i) the channel multi-match with non-matching channels and (ii) the matching channels being affiliate channels of the same network as each other, the computing system could then determine, as the channel rendered by the content presentation device, the network's affiliate channel that serves the content presentation device's market (e.g., serving location).

The theory here is that, when the matching channels are affiliate channels of the same network as each other and when the programs scheduled on those channels at the time of the channel multi-match are different than each other, there is a reasonable chance that the network (e.g., national broadcaster, such as ABC, CBS, NBC, or another) is broadcasting a program that is overrunning its scheduled time slot and therefore that that program as provided by each of the network's affiliate channels is overrunning its scheduled time slot. In this situation, it would therefore be reasonable to select, as the channel rendered by the content presentation device, the network's affiliate channel that serves the content presentation device's market.

Note further that the channel selected through this process need not necessarily be one of the matching channels identified as part of the multi-match group. In practice, the ACR system might have reference fingerprint data for channels in just some but not all markets. Therefore, while the system may detect a channel multi-match as to multiple affiliate channels of a given network, there might be one or more affiliate channels of that network that are not encompassed by the computing system's multi-match finding. For instance, the network could have an affiliate channel that serves the content presentation device's market but that is not one of the channels in the multi-match group. In that case, on the basis noted above, the computing could still reasonably select, as the channel rendered by the content presentation device, the network's affiliate channel that serves the content presentation device's market.

Upon resolving the channel ambiguity through this process, the computing system could then take action, or cause action to be taken, based on the single determined channel. For instance, the computing system could record or report an identity of the single determined channel for use as audience-measurement data and/or could provide or use an identity of the single determined channel as a basis to invoke DAI or other channel-specific action.

Accordingly, disclosed is a method for determining a channel rendered by a content presentation device to facilitate taking a channel-specific action such as recording audience-measurement data and/or invoking dynamic content modification such as DAI. The method involves a computing system detecting a channel multi-match with non-matching programs. Further the method involves the computing system responding to at least the detecting of the channel multi-match with non-matching programs by carrying out a channel-determination process including (a) determining that channels of the multi-match group are all affiliate channels of the same network as each other and (b) determining, as the channel, which affiliate channel of that network serves a location of the content presentation device. And the method involves the system then using determined channel as a basis for carrying out of at least one channel-specific operation, such as recording audience-measurement data and/or invoking dynamic content modification.

Further disclosed is a computing system including a network communication interface, a processing unit, non-transitory data storage, and program instructions stored in (e.g., on) the non-transitory data storage and executable by the processing unit to carry out these and/or other disclosed operations. And disclosed is a computer-readable storage medium encoding, embodying, and/or otherwise storing program instructions executable by a processing unit to carry out such operations.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
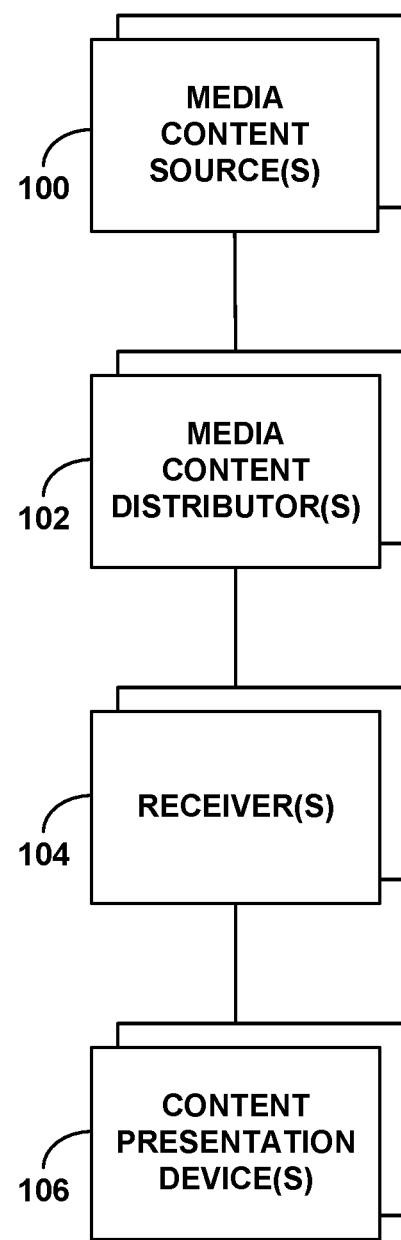
FIG. 1 is a simplified block diagram of an example system in which various disclosed principles can be implemented.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 100 (e.g., broadcasters, web servers, etc.), one or more media content distributors 102 (e.g., multi-channel distributors, such as cable providers, satellite providers, over-the-air broadcast providers, web aggregators, etc.), one or more media content receivers 104 (e.g., cable receivers, satellite receivers, over-the-air broadcast receivers, computers or other streaming media receivers, etc.), and one or more clients or content presentation devices 106 (e.g., televisions or other display devices, loudspeakers or other audio output devices, etc.)

In practice, the media content sources 100 could be national broadcast networks or other networks, such as ABC, NBC, CBS, FOX, HBO, and CNN, each network comprising respective components to generate or otherwise provide content such as programs, commercials, and the like for distribution and ultimate receipt and playout by content presentation devices.

The media content distributors 102 could then be local affiliates of those networks, each local affiliate serving a respective designated market area (DMA) and comprising components to receive a broadcast feed from its respective network and to output that broadcast feed on a respective affiliate channel for transmission to customer premises. Such an affiliate could itself provide the physical communication means for transporting its affiliate channel to customer premises. For instance, the affiliate could provide its own terrestrial over-the-air service, cable service, or satellite service to customer premises and could transmit its affiliate channel to customer premises through those or other means. Alternatively, an affiliate could distribute its affiliate channel to customer premises through one or more other entities. For instance, the affiliate could provide its affiliate channel to another content distributor that provides terrestrial over-the-air service, cable service, or satellite service to customer premises, and that other content distributor could thus transmit the affiliate channel to customer premises through those or other means. The receivers 104 and content presentation devices 106 could then be situated at customer premises, such as homes or business establishments.

With this or other arrangements, the content sources 100 could deliver media content to various content distributors 102 for distribution to receivers 104 at customer premises, and the content distributors 120, by themselves or through other distributors, could distribute the media content to the receivers 104 on discrete channels (e.g., particular frequencies or other defined channels). Each receiver 104 could then respond to user input or one or more other triggers by tuning to a selected channel and outputting to a content presentation device 106 the media content that is arriving on the selected channel. And the content presentation device 106 could receive and render the media content (e.g., display or otherwise present the content).

In this or other arrangements, as noted above, as the content presentation device receives and renders this media content, the content presentation device may have no indication of the channel on which the media content is arriving, e.g., of the channel to which the receiver is tuned. Rather, the content presentation device may be configured simply to receive the media content as a media stream from the receiver and to render the received media content. Per the present disclosure, however, the content presentation device may be in communication with a network server and may work with the network server to facilitate identification of the channel and thus to facilitate taking useful channel-specific action.

Figure 2:
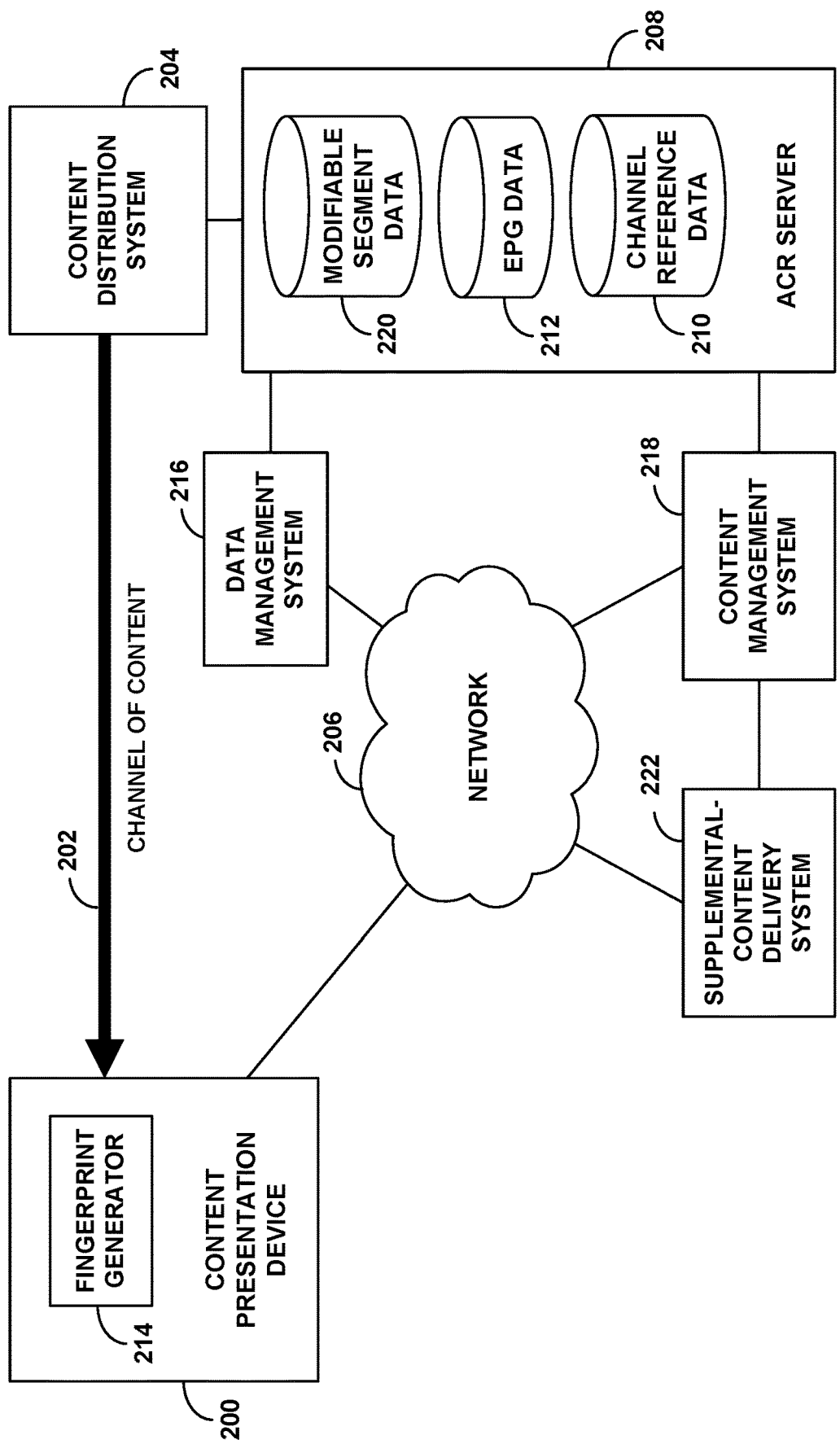
FIG. 2 is a simplified block diagram of an example network arrangement in which various disclosed principles can be implemented.

FIG. 2 illustrates more specifically an example system in connection with which the presently disclosed features could be implemented.

FIG. 2 shows at its top a representative content presentation device 200 receiving a channel of content 202 being provided by a content distribution system 204. By way of example, the content presentation device 200 could be an example content presentation device 100 as shown in FIG. 1, and the content distribution system 204 could comprise a representative media content source 100 and/or media content distributor 102 as shown in FIG. 1.

As such, the content presentation device 200 could be receiving and rendering the channel of content as a linear broadcast feed directly or indirectly from the content distributor system 204 through any of a variety of distribution channels, such as but not limited to cable, satellite, terrestrial over-the-air broadcast, broadband streaming, or others now known or later developed.

In an example implementation, the media content of the channel could define a sequence of digital frames of media content that the content presentation device is configured to render for presentation to a user. The content distributor system 204 might be broadcasting this sequence of frames encapsulated in a transport stream for receipt by a set top box, tuner, or other receiver that is tuned to the channel, and the receiver may be extracting the sequence of frames from the transport stream and outputting the sequence of frames for presentation by the content presentation device.

As further shown in FIG. 2, the content presentation device 200 is interconnected with a communication network 206, such as the Internet. For instance, the content presentation device 200 may sit as a node on a local area network (LAN) at customer premises, with the content presentation device having an assigned Internet Protocol (IP) address on the LAN and the LAN having an IP address on the network 206. The content presentation device 200 could thus engage in data communication with various entities via the network 206 while the content presentation device 200 is receiving and rendering the channel of content 202 provided by the content distribution system 204.

Shown accessible via the network 206 (e.g., at a defined IP address on the network) is an ACR server 208, which could operate to engage in the fingerprint-based ACR processing noted above. With this network arrangement, the content presentation device 200 could engage in IP communication with the ACR server 208 via network 206, providing the ACR server 208 with query fingerprints representing the media content of the channel 202 that the content presentation device 200 is rendering. And the ACR server 208 could compare those query fingerprints with reference fingerprints of various known channels, in an effort to determine the channel 202 that the content presentation device 200 is rendering.

In line with the discussion above, the ACR server 208 could be provisioned with channel reference data 210 that includes reference fingerprints and associated channel-identification data respectively for each of various known channels.

In practice, for instance, the content distribution system 204 (e.g., one or more content providers) could generate and provide the reference fingerprints and associated channel-identification data to the ACR server on an ongoing basis respectively for each of various such channels. For instance, as to each channel of media content that the content distribution system outputs for delivery to content presentation devices, the content distribution system could generate timestamped digital reference fingerprints of the media content on a per frame basis or other ongoing basis, using any digital fingerprinting process now known or later developed, and could provide the ACR server with the time-stamped digital reference fingerprints along with channel-identification data identifying the associated channel.

In a representative implementation, the channel-identification data provided per channel can characterize each channel by various attributes. For example, the channel-identification data could characterize each channel by its content provider, such as with a unique identification name and/or number of a network (e.g., national broadcaster) with which the channel is affiliated. And the channel-identification data could additionally characterize each channel by its content distributor, such as with a unique identification name and/or number of a network affiliate that provides the channel. Further, where a receiver or other such device provides multiple different channels selectable by channel number and/or channel name, the channel-identification data might characterize each channel by its respective channel number or name in that context as well.

Further the digital fingerprinting process could take various forms. Without limitation, for instance, an example digital fingerprinting process for video could apply on a per video frame basis and could involve establishing a representation of luminosity and/or other video characteristics. For instance, for a given video frame, a fingerprint generator could programmatically divide the frame into a grid, and the fingerprint generator could measure luminosity of the frame per grid cell and generate a bit string with each bit or series of bits representing luminosity of a respective grid cell, or representing a weighted difference between the luminosity of certain defined pairs of the grid cells, or the like. Further, the fingerprint generator could apply this process continually to generate the digital fingerprint over time as a sequence of fingerprints (e.g., as a fingerprint stream). For instance, the fingerprint generator could apply this process to each frame, to each key frame, periodically, or on another defined basis, with each frame's bit string defining a digital fingerprint and/or with a specified hash, combination or series of such bit strings or other representative values defining a digital fingerprint, on a sliding window basis. Other digital fingerprinting processes could be used as well.

As the ACR server 208 receives these reference fingerprints and associated channel-identification data, the ACR server 208 could store this information as part of reference data 210 in a relational database or other form suitable for ready searching and access. Further, note that the ACR server 208 could alternatively generate some or all of this reference data itself and/or receive or otherwise have access to the reference data in another manner.

In addition, in a representative implementation, the ACR server 208 could also be provisioned with or otherwise have access to EPG data 212, specifying a scheduled program lineup respectively for each of various known channels. This EPG data could be keyed to channel-identification and could specify program timeslots and program-identification per timeslot on a per-channel basis. The ACR server 208 could likewise receive this EPG data from the content distribution system 204 or from one or more other sources and could store the EPG data for ready searching and access. Although the figure shows the EPG data 212 separate from the channel reference data 210, these two sets of data could alternatively be integrated together or provided in another manner.

In addition, as shown, the content presentation device 200 could be equipped with a fingerprint generator 214 (e.g., program instructions executable by a processor of the content presentation device 200), which could be configured to generate query fingerprints representing the media content of the channel 202 that the content presentation device 200 is rendering at any given time. The fingerprint generator 214 could be configured to receive as input a copy of the media content of the channel as the media content arrives at the content presentation device 200 and/or is processed for presentation by the content presentation device 200, and the fingerprint generator 214 could be configured to generate the query fingerprints of the media content on a per frame basis or other ongoing basis, using the same digital fingerprinting process used to generate the reference fingerprints, so as to facilitate a comparison of the query fingerprints with the reference fingerprints.

Further, the content presentation device 200 could be configured to transmit its generated query fingerprints via network 206 to the ACR server 208 for analysis, to facilitate fingerprint-based ACR and associated channel-specific action. By way of example, the content presentation device 200 could be configured to periodically or from time to time transmit to the server the query fingerprints representing a latest series of frames of the channel being rendered by the content presentation device 200. For instance, the content presentation device 200 could generate a message carrying the latest generated query fingerprints, along with one or more timestamps and/or other associated data, and could transmit the message from an IP address of the content presentation device to an IP of the ACR server 208 for analysis.

As noted above, given the query fingerprints representing media content of the channel 202 being rendered by the content presentation device 200, and given the reference data including reference fingerprints respectively representing each of various known channels, the ACR server 208 could engage in fingerprint-based ACR processing. In particular, as noted, the fingerprint-matching server could compare the query fingerprints with the reference fingerprints in an effort to find a match.

To compare a given query fingerprint with a given reference fingerprint, the ACR server 208 could compare corresponding portions of the fingerprints with each other to determine whether the portions match exactly or within defined tolerances. For example, the ACR server 208 could compute a maximum deviation between the fingerprints and determine if the maximum deviation is within a predefined tolerance. Further, if the fingerprints are binary, this could be a Boolean determination or could involve computing a Hamming distance (as a count of mismatches between respective bit locations in the fingerprints), and if the fingerprints are more complex values, such as decimal values or vectors (e.g., grey values per video frame region), this could involve determining a distance between the values or vectors. Numerous other examples are possible as well.

Upon finding with sufficient certainty that the query fingerprints match the reference fingerprints of just one specific channel, the ACR server 208 could then conclude that that is the channel being rendered by the content presentation device 200.

And as further noted above, based on this determined identification of the channel being rendered by the content presentation device, the ACR server 208 could then carry out, or cause to be carried out, one or more useful channel-specific actions.

By way of example, the ACR server 208 could responsively report to a data management system 216 that the content presentation device 200 is presenting the identified channel, as a record of media consumption that could help facilitate targeted advertising or other operations.

For instance, the ACR server 208 could generate and transmit to the data management system 216 an ACR data record that includes information such as the following, for addition to a set of audience-measurement data used as a basis for channel ratings:

(1) Timestamp—representing a date and time of the fingerprint match or of the associated content presentation, measured along a linear timeline with respect to the channel of content for instance. The ACR server 208 could determine this timestamp from a system clock and/or from one or more fingerprint timestamps.

(2) Device ID—a unique identifier of the content presentation device. The ACR 208 could receive this device ID from the content presentation device 200 together with the query fingerprint data or could otherwise determine this data.

(3) Channel ID—channel-identification information that uniquely identifies the channel whose reference fingerprint data the ACR server 208 determined to match the query fingerprint data. The ACR server 208 could determine this information from the channel-identification data included in the reference data 210.

(4) Program ID—program-identification information that uniquely identifies the program that the EPG data 212 specifies was scheduled on the channel at the time of the fingerprint match. The ACR server 208 could determine this information by querying to the EPG data 212 based on channel identification and time information.

Further, as another example, the ACR server 208 could use the identified channel as a basis to invoke dynamic content modification, such as DAI.

To facilitate dynamic content modification in an example implementation, the ACR server 208 may have received in advance from a content management system 218 a set of modifiable content segment data 220 including fingerprints of each of various modifiable content segments (e.g., replaceable ads) and with associated metadata. Thus, having identified the channel being rendered by the content presentation device, the ACR server 208 could then responsively commence comparing the reference fingerprints of that identified channel with the fingerprints of the various modifiable content segments in an effort to find a match. And upon finding with sufficient certainty that the identified-channel reference fingerprints match the fingerprints of a specific modifiable content segment, the ACR server 208 could then engage in signaling to enable and cause the content presentation device 200 to carry out a content modification with respect to that modifiable content segment.

For instance, the ACR server 208 could provide the content presentation device 200 with various data regarding the upcoming modifiable content opportunity, including timing information and other content-modification information for example, to enable the content presentation device to obtain supplemental content. And the ACR server 208 could provide the content presentation device 200 with certain reference fingerprints of the identified channel for use by the content presentation device 200 to help confirm that the content presentation device 200 continues to receive the identified channel, as a condition for starting or continuing with the content modification.

The content presentation device 200 could then engage in signaling via network 206 with the content management system 218 and perhaps with a supplemental-content delivery system 222, to ascertain and obtain supplemental content (e.g., a replacement advertisement). And the content presentation device 200 could carry out the content modification with respect to the modifiable content segment.

As indicated above, a problem that can arise when the ACR server 208 carries out its fingerprint-based ACR content analysis is that the ACR server 208 may detect a multi-match scenario. Namely, the ACR server 28 may detect with sufficient confidence that the query fingerprint data provided by the content presentation device 200 matches reference fingerprint data respectively of each of multiple known channels. For instance, when the ACR server 208 compares with the reference fingerprint data a latest query fingerprint representing a frame of media content being rendered by the content presentation device, the ACR server 208 may determine with sufficient confidence that the query fingerprint matches reference fingerprints of multiple known channels.

Variations on this process of detecting this multi-match scenario are possible as well. For instance, if the ACR server 208 compares groups of fingerprints at a time, the ACR server 208 may determine with sufficient confidence that a latest set of query fingerprints representing frames of media content being rendered by the media presentation device matches sets of reference fingerprint data respectively representing media content of multiple known channels. Further, the ACR server 208 could compare various channels' reference fingerprint data with each other and could flag a set of channels as being a candidate multi-match group based on a finding that the channels' reference fingerprint data matches each other, and the ACR server 208 could then detect a multi-match scenario with respect to that group of channels by determining that the query fingerprint data from the content presentation device matches the reference fingerprint data of at least one of the channels in the group and determining that the group is flagged as a candidate multi-match group.

When the ACR server 208 detects a multi-match scenario, the ACR server 208 could responsively generate a multi-match log, and the ACR server 208 could likewise transmit the multi-match log to the data management system 216.

In a representative implementation, the ACR server 208 could include in this multi-match log various useful information that describes the multi-match scenario encountered by the ACR server 208. For example, the multi-match log could include data specifying at least the following information:

(1) Timestamp—representing a date and time of the multi-match or associated content presentation, measured along a linear timeline with respect to the channel of content for instance. As noted above, the ACR server 208 could determine this timestamp from a system clock and/or from one or more fingerprint timestamps.

(2) Device ID—a unique identifier of the content presentation device. As noted above, the ACR 208 could receive this device ID from the content presentation device 200 together with the query fingerprint data or could otherwise determine this data.

(3) Multiple Channel IDs—channel-identification information that uniquely identifies each respective channel in the multi-match group, i.e., each of the channels whose reference fingerprint data the ACR server 208 determined to match the query fingerprint data. The ACR server 208 could determine this information from the channel-identification data included in the reference data 210.

(4) Multiple Program IDs—program-identification information that uniquely identifies, respectively for each channel of the multi-match group, the program that the EPG data 212 specifies was scheduled on that channel at the time of the multi-match. The ACR server 208 could determine these program identifiers by querying to the EPG data 212 based on channel identification and time information.

In line with the discussion above, when the ACR server 208 generates this multi-match log, the ACR server 208 may detect a channel multi-match with non-matching programs. For instance, based on the ACR server's analysis of the EPG data for the channels that make up the multi-match group, the ACR server 208 could determine that at least two of the channels were scheduled at the time of the multi-match to be presenting different programs than each other. More particularly, the ACR server 208 might determine that at least a predefined threshold percentage of the identified programs (one per channel in the multi-match group) were different than each other. This predefined threshold percentage could be 100%, where all of the identified programs were different than each other, or could be a lower percentage that encompasses at least two of the identified programs.

Alternatively, the data management system 216 could detect based on the multi-match log a channel multi-match with non-matching programs. For instance, the data management system 216 could determine that the multi-match log lists multiple matching channels and specifies at least the predefined threshold percentage of different programs that were scheduled to be presented on the channels of the multi-match group.

In response to at least detecting this channel multi-match with non-matching programs (i.e., specifically in response to at least this combination of factors), the ACR server 208, the data management system 216, and/or one or more other entities defining a representative computing system could then carry out the presently disclosed process in an effort to identify the channel that was being rendered by the content presentation device 200 at the time of the multi-match.

As noted above, the process that is carried out in response to at least detecting the channel multi-match with non-matching programs could involve taking into consideration the network affiliation of a content distributor that distributes the channel to the content presentation device 200. In particular, as noted above, the computing system could determine that the channels in the multi-match group are all affiliate channels of the same network as each other, and based on that determination, the computing system could then determine, as the channel rendered by the content presentation device 200, that network's affiliate channel the serves the content presentation device's market.

In operation, the computing system could first evaluate the channel-identification information of each of the channels in the multi-match group, i.e., each of the channels whose reference fingerprint data the ACR server 208 found to match the query fingerprint data from the content presentation device 200. For instance, if provided with a multi-match log such as that described above, the computing system could refer to the multi-match log to determine this channel-identification.

Considering this channel-identification information, the computing system could determine whether the channels in the multi-match group are affiliate channels of the same network as each other. For instance, the computing system might find that the channels of the multi-match group are NBC_Miami, NBC_Chicago, NBC_San Francisco, NBC_Atlanta, NBC_Phoenix, and NBC_Denver, and could determine from those channels' identification information that they are all local affiliate channels of the NBC network. Alternatively, or as a n addition step if the computing system determines that fewer than 100% of the channels of the multi-match group are affiliate channels of the same network as each other, the computing system could consider whether at least some lower threshold percentage of the channels of the multi-match group are affiliate channels of the same network as each other. For this purpose, the threshold percentage could be in the range of about 70% to 90%, among other possibilities.

Responsive to finding that the channels of the multi-match group are all affiliate channels of the same network as each other, the computing system could then work to determine which affiliate channel of that network serves the content presentation device's market, and the computing system could deem that particular affiliate channel to be the channel rendered by the content presentation device 200.

To determine which affiliate channel of the network serves the content presentation device's market, the computing system could determine a location of the content presentation device, and the computing system could then map that determined location to particular affiliate channel of the network, based on that affiliate channel serving the determined location.

The computing system could determine a location of the content presentation device 200 in various ways. For example, a user of the content presentation device 200 could input this location information into a configuration dialog provided by the content presentation device or the content presentation device 200 could determine the location in another manner, and the content presentation device 200 could transmit this location information to the ACR server 208 in advance and/or together with query-fingerprint reporting, to notify the ACR server 208 of the location. Alternatively, the computing system could determine the location of the content presentation device 200 based on the IP address of the content presentation device 200 as used for messaging between the content presentation device 202 and the ACR server 208. For instance, the computing system could query an IP-address mapping database to find the geographic location corresponding with that IP address. The computing system could further include this location information in the multi-match record and/or other such record, and the computing system could then determine the location of the content presentation device 200 from that record.

Having determined the location of the content presentation device, the computing system could then determine which one of the network's affiliate channels serves that particular location. In the above example, for instance, where all of the channels of the multi-match group are NBC affiliates, at issue would be which NBC affiliate serves the determined location of the content presentation device 200. (Typically, just one affiliate of the network would serve a given market; if more than affiliate does, then additional factors could be taken into account to complete the channel determination.)

To facilitate determining which one of the network's affiliate channels serves the determined location of the content presentation device, the computing system could be provisioned with or otherwise have access to affiliate service-area data that specifies for each affiliate channel of each network the geographic scope of that affiliate channel's serving market. For instance, if a given affiliate channel of a given network serves a particular city or other region, this affiliate service-area data could define geographic boundaries of that region. This affiliate service-area data could be established by manual engineering input, automatically through drive-testing or the like, or in another manner.

Having determined that all of the channels of the multi-match group are of a given network, and having determined the location of the content presentation device 200, the computing system could thus query the affiliate service-area data based on that network and device location, to determine which affiliate channel of that network serves that location. And the computing system could conclude that that determined channel is the channel rendered by the content presentation device.

As noted above, the affiliate channel that the computing system determines through this process may or may not be one of the channels in the multi-match group. It is possible, for instance, that the reference data received by or otherwise accessible to the ACR server 208 encompasses only some, but not all, of the affiliate channels of the a given network. As to NBC, for instance, as an arbitrary example, the reference data might encompass just the affiliate channels noted above but might not encompass an NBC affiliate channel Bismark, North Dakota, NBC_Bismark. Nevertheless, through the above process, the computing system might determine that the content presentation device is located in Bismark and, given that all of the channels in the multi-match group were affiliates of NBC and given that NBC_Bismark is the Bismark affiliate of NBC, the computing system could conclude that the channel rendered by the content presentation device is NBC_Bismark.

Once the computing system has thereby determined the channel rendered by the content presentation device, the computing system could then use that determined channel as a basis to carry out a channel-specific action as discussed above.

For example, the computing system could record the determined channel as a single-match ACR data record as noted above, for addition to a set of audience-measurement data used as a basis for channel ratings. Here, for instance, if the ACR server 208 carried out the process, the ACR server 208 could then generate and provide the data management system 216 with the single-match ACR data record. Or if the data management system 216 carried out the process, the data management system 216 could itself generate and record the single-match ACR data record.

And as another example, the computing system could use the determined channel as a basis for carrying out dynamic content modification such as DAI. And here, for instance, if the data management system 216 carried out the process, the data management system 216 could report the determined channel to the ACR server 208, and the ACR server 208 could then invoke the dynamic content modification as described above. Whereas, if the ACR server 208 carried out the process, the ACR server 208 proceed immediately with invoking the dynamic content modification process.

Other examples are possible as well.

Figure 3:
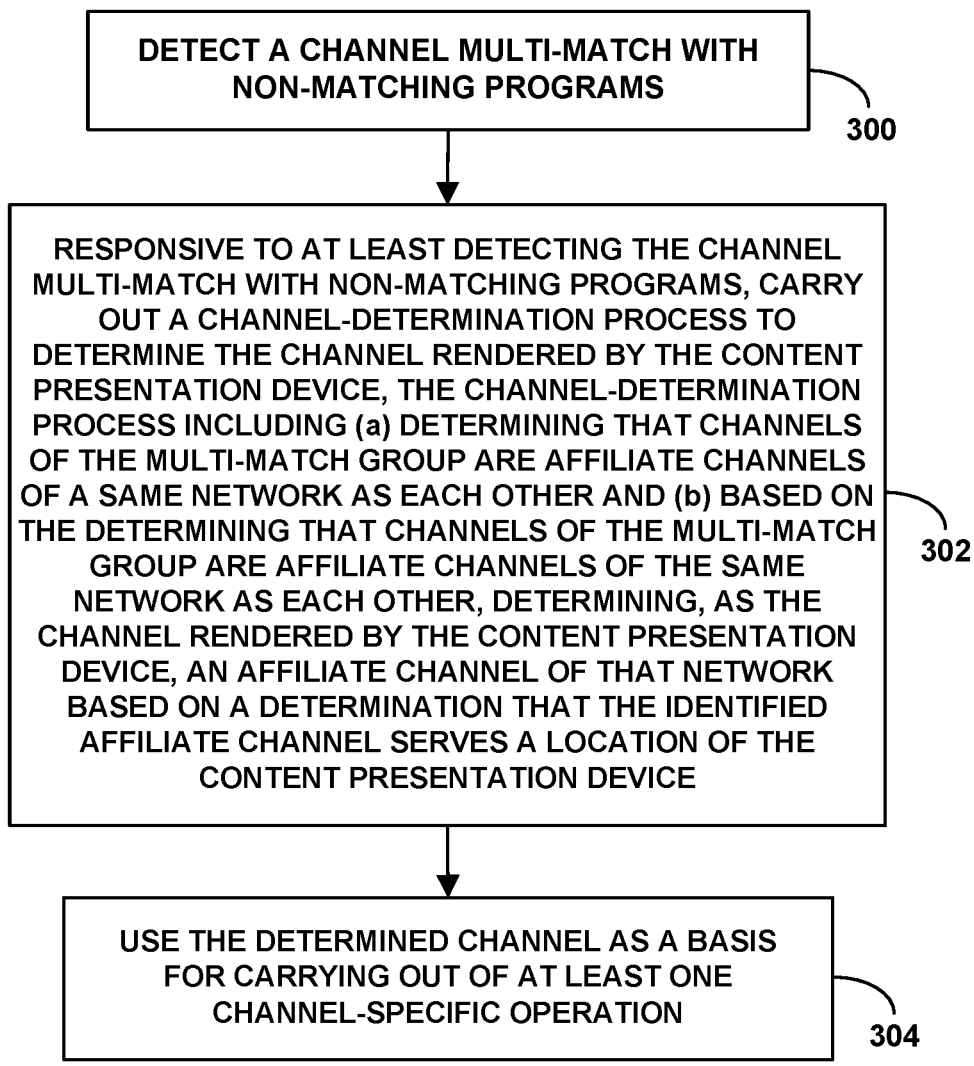
FIG. 3 is a flow chart depicting operations that can be carried out in accordance with the present disclosure.

FIG. 3 is next a flow chart depicting a method that can be carried out in line with the discussion above. One or more of the operations in the method depicted by FIG. 3 could be carried out by one or more entities, including, without limitation, ACR server 208 or data management system 216, and/or one or more entities operating on behalf of or in cooperation with these or other entities. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations.

As shown in FIG. 3, at block 300, the method includes detecting a channel multi-match with non-matching programs. At block 302, the method then includes, responsive to at least detecting the channel multi-match with non-matching programs, carrying out a channel-determination process to determine the channel rendered by the content presentation device, the channel-determination process including (a) determining that channels of the multi-match group are affiliate channels of a same network as each other and (b) based on the determining that channels of the multi-match group are affiliate channels of the same network as each other, determining, as the channel rendered by the content presentation device, an affiliate channel of that network based on a determination that the identified affiliate channel serves a location of the content presentation device. And at block 304, the method includes using the determined channel as a basis for carrying out of at least one channel-specific operation.

In line with the discussion above, such a computing system could receive from the content presentation device, via a network communication interface, the query fingerprint data representing the channel of content rendered (e.g., being rendered, having been rendered, or in queue to be rendered) by the media presentation device.

Further, as discussed above, the act detecting a channel multi-match with non-matching programs could include (i) detecting, based on digital-fingerprint comparison, a channel multi-match in which query fingerprint data representing a channel rendered by a content presentation device matches multiple instances of reference fingerprint data corresponding respectively with multiple known channels and (ii) detecting that, at a time of the detected channel multi-match, the multiple known channels were scheduled to be presenting different programs than each other.

Still further, as discussed above, the act of determining that channels of the multi-match group are affiliate channels of a same network as each other could involve determining that 100% of the channels of the multi-match group are affiliate channels of the same network as each other. Or the act of determining that channels of the multi-match group are affiliate channels of a same network as each other could involve determining that at least a predefined threshold portion (e.g., percentage) of the channels of the multi-match group are affiliate channels of the same network as each other.

In addition, as discussed above, the channel-determination process could additionally include determining the location of the content presentation device (e.g., based on location information provided by the content presentation device and/or based on a network address (e.g., IP address) of the content presentation device). And in that case, the act of determining, as the channel rendered by the content presentation device, the affiliate channel of the network based on a determination that the identified affiliate channel serves a location of the content presentation device could involve determining, as the channel rendered by the content presentation device, the affiliate channel of the network based on a determination that the identified affiliate channel serves the determined location of the content presentation device.

In addition, as discussed above, the at least one channel-specific operation that could be carried out based on the single known channel established through the disambiguation process could take various forms. For instance, the channel-specific operation could involve providing a record of the content presentation device rendering the single known channel, for use in channel ratings. Further or alternatively, the channel-specific operation could involve using an identity of the single known channel as a basis to invoke dynamic content modification, such as DAI, among other possibilities.

Note also that, in this method, the process facilitates determining the channel rendered by the content presentation device, but this determination may or may not be correct in every instance. Still, the method could be carried out in an effort to facilitate channel identification and to facilitate taking associated channel-specific action.

Figure 4:
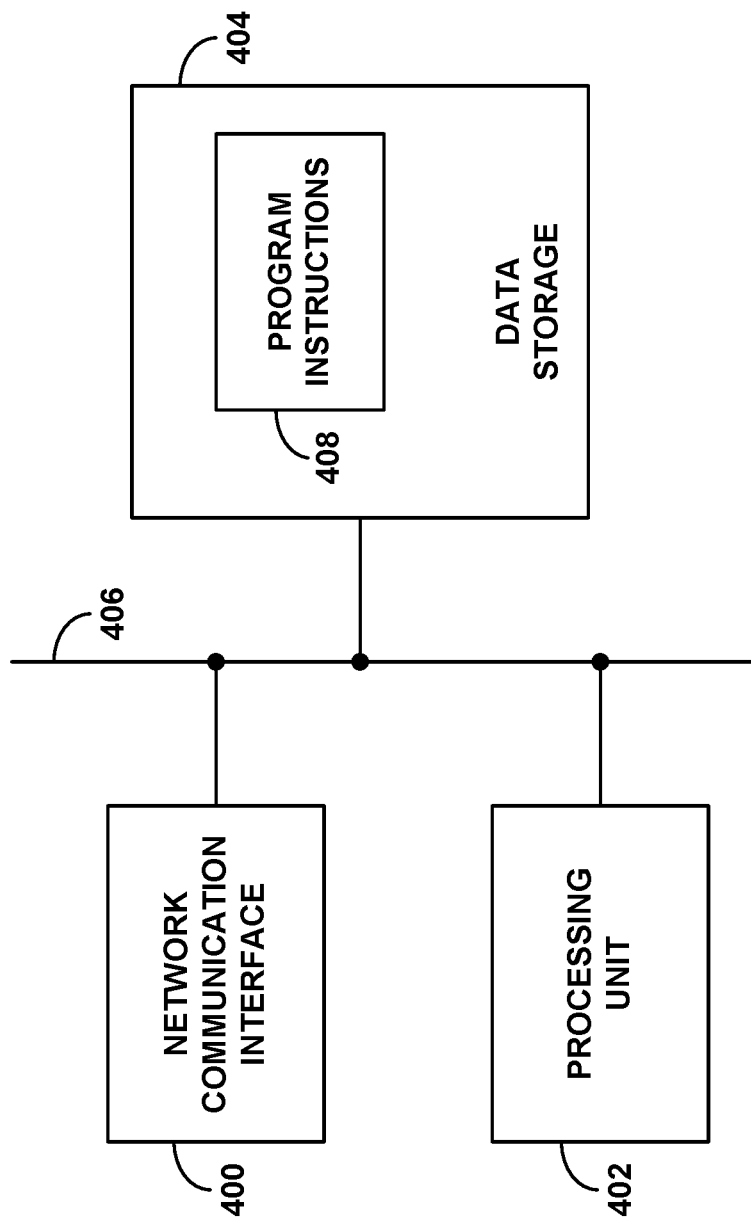
FIG. 4 is a simplified block diagram of an example computing system.

FIG. 4 is next a simplified block diagram of an example computing system operable in accordance with the present disclosure. This system could represent one or more network servers or other entities, such as ACR server 208, data management system 216, or others. As shown in FIG. 4, the example system includes at least one each of a network communication interface 400, a processing unit 402, and non-transitory data storage 404, any or all of which could be integrated together or, as shown, communicatively linked together by a system bus, network, or other connection mechanism 406.

Network communication interface 400 could comprise one or more physical network connection mechanisms to facilitate communication on a network such as network 206 discussed above, and/or for engaging in direct or networked communication with one or more other local or remote entities. As such, network communication interface 400 could comprise a wireless or wired Ethernet interface or other type of network interface, for engaging in IP communication and/or other type of network communication.

Processing unit 402 could comprise one or more general purpose processors (e.g., microprocessors) and/or one or more specialized processors (e.g., application specific integrated circuits). And non-transitory data storage unit 404 could comprise one or more volatile and/or non-volatile storage components, such as optical, magnetic, or flash storage.

As shown, the non-transitory data storage 404 then stores program instructions 408, which could be executable by any of the one or more processing units 402 to carry out various operations described herein, such as the operations depicted in FIG. 3 and described above for instance.

Various features described above could be applied in this context as well, and vice versa.

Figure 5:
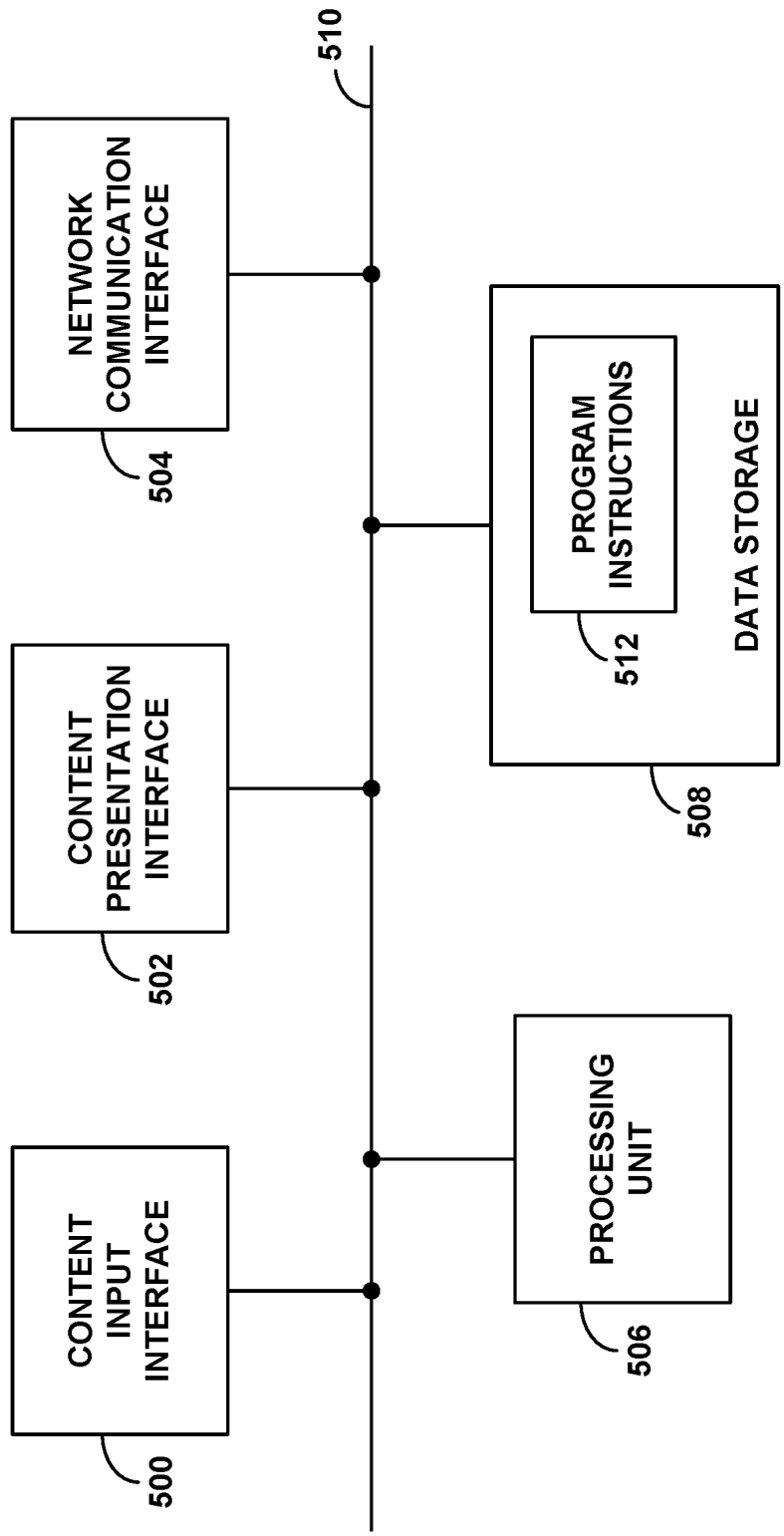
FIG. 5 is a simplified block diagram of an example content presentation device.

FIG. 5 is next a simplified block diagram of an example content presentation device operable in accordance with the present disclosure. In line with the discussion above, this content presentation device could take various forms. For instance, it could be a television, computer monitor, or other device that operates to receive and render video content, and/or it could be a loudspeaker, a pair of headphones, or other device that operates to receive and render audio content. Numerous other examples are possible as well.

As shown in FIG. 5, the example content presentation device includes at least one each of a media input interface 500, a media presentation interface 502, a network communication interface 504, a processing unit 506, and non-transitory data storage 508, any or all of which could be integrated together or, as shown, communicatively linked together by a system bus, network, or other connection mechanism 510.

Media input interface 500 could comprise a physical communication interface for receiving media content to be presented by the content presentation device. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others.

Media presentation interface 502 could comprise one or more components to facilitate presentation of the received media content. By way of example, the media presentation interface could comprise a user interface such as a display screen and/or a loudspeaker, as well as one or more drivers or other components for processing the received media content to facilitate presentation of the content on the user interface.

Network communication interface 504 could comprise a physical network connection mechanism to facilitate communication on a network such as network 206 discussed above, and/or for engaging in direct or networked communication with one or more other local or remote entities. As such, the network communication interface could comprise a wireless or wired Ethernet interface or other type of network interface, for engaging in IP communication and/or other type of network communication.

Further, processing unit 506 could then comprise one or more general purpose processors (e.g., microprocessors) and/or one or more specialized processors (e.g., application specific integrated circuits). And non-transitory data storage 508 could comprise one or more volatile and/or non-volatile storage components, such as optical, magnetic, or flash storage. Further, as shown, non-transitory data storage 508 stores program instructions 512, which could be executable by processing unit 506 to carry out various content-presentation-device operations described here.

Note that, while the above description provides for using network affiliation to determine the channel in response to having detected a channel multi-match with non-matching programs, the computing system could alternatively use network affiliation to determine the channel in other scenarios as well.

By way of example, the computing system could use network affiliation to determine the channel in response to detecting a channel multi-match without regard to whether the associated programs match. For instance, the computing system could determine that at least a predefined threshold percentage of the channels in the multi-match group are affiliate channels of the same network as each other, and in response to at least that determination, the computing system could (i) determine which affiliate channel of that network serves the location of the content presentation device and (ii) based at least on the determination that that affiliate channel of that network serves the location of the content presentation device, conclude that that affiliate channel is the channel rendered by the content presentation device 200. The computing system could then use the determined channel as a basis for carrying out of at least one channel-specific operation.

Exemplary embodiments have been described above. Those skilled in the art will understand, however, that changes and modifications may be made to these embodiments without departing from the true scope and spirit of the invention.

What is claimed is:

1. A method comprising:
    detecting by a computing system a channel multi-match with non-matching programs, wherein detecting the channel multi-match with non-matching programs includes (i) detecting, based on digital-fingerprint comparison, a channel multi-match in which query fingerprint data representing a channel rendered by a content presentation device matches multiple instances of reference fingerprint data corresponding respectively with multiple channels, the multiple channels defining a multi-match group, and (ii) detecting that, at a time of the detected channel multi-match, the channels of the multi-match group were scheduled to be presenting different programs than each other;
    responsive to at least detecting the channel multi-match with non-matching programs, carrying out by the computing system a channel-determination process to determine the channel rendered by the content presentation device, the channel-determination process including:
        (a) determining that channels of the multi-match group are affiliate channels of a same network as each other, and
        (b) based on the determining that channels of the multi-match group are affiliate channels of the same network as each other, determining, as the channel rendered by the content presentation device, an affiliate channel of that network based on a determination that the affiliate channel serves a location of the content presentation device; and
    using by the computing system the determined channel as a basis for carrying out of at least one channel-specific operation.

2. The method of claim 1, wherein determining that channels of the multi-match group are affiliate channels of a same network as each other comprises determining that 100% of the channels of the multi-match group are affiliate channels of the same network as each other.

3. The method of claim 1, wherein determining that channels of the multi-match group are affiliate channels of a same network as each other comprises determining that at least a predefined threshold percentage of the channels of the multi-match group are affiliate channels of the same network as each other.

4. The method of claim 1, wherein the channel-determination process further includes determining the location of the content presentation device, wherein determining, as the channel rendered by the content presentation device, the affiliate channel of the network based on a determination that the affiliate channel serves a location of the content presentation device comprises determining, as the channel rendered by the content presentation device, the affiliate channel of the network based on a determination that the affiliate channel serves the determined location of the content presentation device.

5. The method of claim 2, wherein determining the location of the content presentation device is based on location information provided by the content presentation device.

6. The method of claim 2, wherein determining the location of the content presentation device is based on a network address of the content presentation device.

7. The method of claim 1, wherein the at least one channel-specific operation comprises providing a record of the content presentation device rendering the determined channel, for use in channel ratings.

8. The method of claim 1, wherein the at least one channel-specific operation comprises using an identity of the determined channel as a basis to invoke dynamic content modification.

9. The method of claim 8, wherein the dynamic content modification comprises dynamic advertisement insertion.

10. A computing system comprising:
   at least one a network communication interface;
   at least one a processing unit;
   at least one non-transitory data storage; and
   program instructions stored in the at least one non-transitory data storage and executable by the at least one processing unit to carry out operations including:
   receiving from a content presentation device, via the at least one network communication interface, query fingerprint data representing a channel of content rendered by the media presentation device,
   detecting a channel multi-match with non-matching programs, wherein detecting the channel multi-match with non-matching programs includes (i) detecting, based on digital-fingerprint comparison, a channel multi-match in which the received query fingerprint data matches multiple instances of reference fingerprint data corresponding respectively with multiple channels, the multiple channels defining a multi-match group, and (ii) detecting that, at a time of the detected channel multi-match, the channels of the multi-match group were scheduled to be presenting different programs than each other,
   responsive to at least detecting the channel multi-match with non-matching programs, carrying out a channel-determination process to determine the channel rendered by the content presentation device, the channel-determination process including (a) determining that channels of the multi-match group are affiliate channels of a same network as each other and (b) based on the determining that channels of the multi-match group are affiliate channels of the same network as each other, determining, as the channel rendered by the content presentation device, an affiliate channel of that network based on a determination that the affiliate channel serves a location of the content presentation device, and using the determined channel as a basis for carrying out of at least one channel-specific operation.

11. The computing system of claim 10, wherein determining that channels of the multi-match group are affiliate channels of a same network as each other comprises determining that 100% of the channels of the multi-match group are affiliate channels of the same network as each other.

12. The computing system of claim 10, wherein determining that channels of the multi-match group are affiliate channels of a same network as each other comprises determining that at least a predefined threshold percentage of the channels of the multi-match group are affiliate channels of the same network as each other.

13. The computing system of claim 10, wherein the channel-determination process further includes determining the location of the content presentation device, wherein determining, as the channel rendered by the content presentation device, the affiliate channel of the network based on a determination that the affiliate channel serves a location of the content presentation device comprises determining, as the channel rendered by the content presentation device, the affiliate channel of the network based on a determination that the affiliate channel serves the determined location of the content presentation device.

14. The computing system of claim 13, wherein determining the location of the content presentation device is based on location information provided by the content presentation device.

15. The computing system of claim 13, wherein determining the location of the content presentation device is based on a network address of the content presentation device.

16. The computing system of claim 10, wherein the at least one channel-specific operation comprises providing a record of the content presentation device rendering the determined channel, for use in channel ratings.

17. The computing system of claim 10, wherein the at least one channel-specific operation comprises using an identity of the determined channel as a basis to invoke dynamic content modification.

18. The computing system of claim 10, wherein the dynamic content modification comprises dynamic advertisement insertion.

19. A non-transitory computer-readable medium having stored thereon instructions executable by a processing unit to carry out operations including:
   detecting a channel multi-match with non-matching programs, wherein detecting the channel multi-match with non-matching programs includes (i) detecting, based on digital-fingerprint comparison, a channel multi-match in which query fingerprint data representing a channel rendered by a content presentation device matches multiple instances of reference fingerprint data corresponding respectively with multiple channels, the multiple channels defining a multi-match group, and (ii) detecting that, at a time of the detected channel multi-match, the channels of the multi-match group were scheduled to be presenting different programs than each other,
   responsive to at least detecting the channel multi-match with non-matching programs, carrying out a channel-determination process to determine the channel rendered by the content presentation device, the channel-determination process including (a) determining that channels of the multi-match group are affiliate channels of a same network as each other and (b) based on the determining that channels of the multi-match group are affiliate channels of the same network as each other, determining, as the channel rendered by the content presentation device, an affiliate channel of that network based on a determination that the affiliate channel serves a location of the content presentation device, and using the determined channel as a basis for carrying out of at least one channel-specific operation.

20. The non-transitory computer-readable medium of claim 19, wherein determining that channels of the multi-match group are affiliate channels of a same network as each other comprises determining that 100% of the channels of the multi-match group are affiliate channels of the same network as each other.

* * * * *